United States Patent

[11] 3,619,743

| [72] | Inventor | Joseph F. Ferrante<br>Dover, Mass. |
|---|---|---|
| [21] | Appl. No. | 5,661 |
| [22] | Filed | Jan. 26, 1970 |
| [45] | Patented | Nov. 9, 1971 |
| [73] | Assignee | Cornell-Dubilier Electric Corporation<br>Newark, N.J. |

[54] IMPREGNATED CAPACITOR WITH ALL-FILM DIELECTRICS AND AT LEAST ONE FOIL ELECTRODE HAVING A CHEMICALLY PRODUCED PATTERN OF PASSAGES FOR PROMOTING IMPREGNATION
10 Claims, 5 Drawing Figs.

[52] U.S. Cl. .................................................. 317/258, 317/260
[51] Int. Cl. .................................................. H01g 3/21
[50] Field of Search .................................................. 317/258, 260

[56] References Cited
UNITED STATES PATENTS

| 3,012,176 | 12/1961 | Williams et al. | 317/258 |
| 3,156,853 | 11/1964 | West | 317/258 |
| 3,340,446 | 9/1967 | Cox | 317/258 |
| 3,363,156 | 1/1968 | Cox | 317/258 X |
| 3,430,116 | 2/1969 | Johnstone | 317/258 |
| 3,522,496 | 8/1970 | Grahame | 317/258 |

FOREIGN PATENTS

| 106,535 | 1/1939 | Australia | 317/260 |

Primary Examiner—Laramie E. Askin
Attorney—Paul S. Martin

ABSTRACT: Impregnated capacitors having all-film dielectrics utilize one or more foil electrodes whose surfaces are etched or coeered with a porous oxide to provide entry passages for impregnating liquid. The passages are too fine for the film to fill before or during the impregnation process.

PATENTED NOV 9 1971 3,619,743

INVENTOR
JOSEPH F. FERRANTE
BY
Paul S. Martin
ATTORNEY

IMPREGNATED CAPACITOR WITH ALL-FILM DIELECTRICS AND AT LEAST ONE FOIL ELECTRODE HAVING A CHEMICALLY PRODUCED PATTERN OF PASSAGES FOR PROMOTING IMPREGNATION

The present invention relates to capacitors of the type utilizing synthetic film as the dielectric, impregnated for improved resistance to corona. When pockets of gas are subjected to high voltage stresses, corona tends to develop. Thorough impregnation tends to fill the voids between the electrodes, and increases the corona start voltage.

Various synthetic films have proved attractive as dielectrics in capacitors. The dielectric constant of a given polymer film may be moderate or low, but where the dielectric strength of the film is high the dielectric film that is used can be very thin. The resulting capacitor can be quite small for a given VA rating.

Thorough impregnation is essential in order to realize the intrinsically high dielectric strength of various polymer films as capacitor dielectrics. It has been common in the manufacture of capacitors having synthetic films to promote thorough impregnation by including a paper strip together with a polymer film, and between two polymer films where more dielectric strength is needed. The paper serves as a wick, and promotes penetration of the impregnating liquid from the ends of the wound capacitor section deep and thoroughly into its interior. However, the paper increases the separation between the electrode surfaces and reduces the capacitance. Not only is the total thickness of the dielectric increased thereby increasing the bulk of the capacitor section for the same length of wound foil and dielectric strips, but in order to attain the same capacitance with film and paper compared to that theoretically attainable with film and no paper, the length of the electrode foils and of the dielectric strips must be increased considerably.

An object of the present invention resides in providing new and effective forms of liquid-impregnated capacitors using all-film dielectrics, i.e., free of paper strips.

In two illustrative but exemplary embodiments of the invention described below in detail, the capacitor section to be impregnated is wound of strips of aluminum foil and polypropylene film using either one or two strips of the film as the dielectric that separates each layer of dielectric from the foils that constitute opposite electrodes. The foils have surfaces treated to develop an overall surface pattern of minute passages or fissures. The passages are so fine that the dielectric film in face contact with the foil cannot become deformed so as to fill and close off the passages, and therefore the passages remain open for penetration of the wound capacitor section by the impregnant. The surface deformation is created by chemical etch in one example, and by conversion of the foil surface to a porous oxide in another example. The pattern or network of fine grooves could also be produced mechanically by embossing or coining rollers, but practical limitations prompt the use of chemical treatment of the foil as more feasible.

The nature of the invention will be understood better from the following detailed description of two embodiments, in which reference is made to the accompanying drawings. In the drawings.

Figure 2:
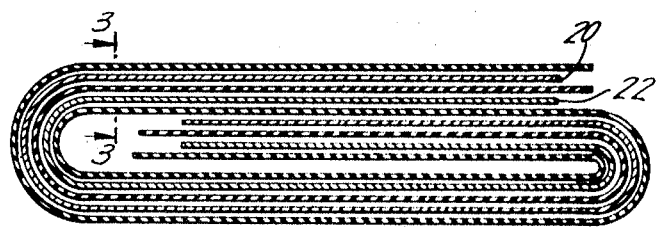
FIG. 2 is a diagrammatic fragmentary cross section of a wound capacitor section utilizing polymer films as the wound dielectrics between the foil electrodes.
Figure 3:
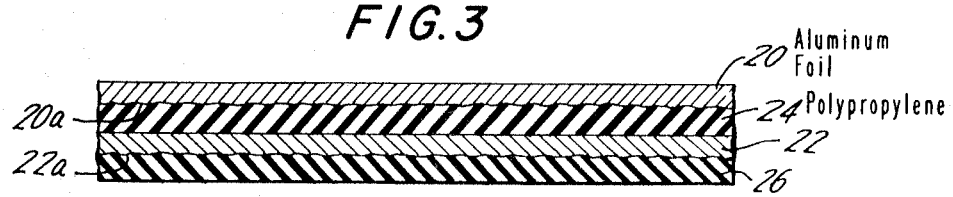
Figure 4:
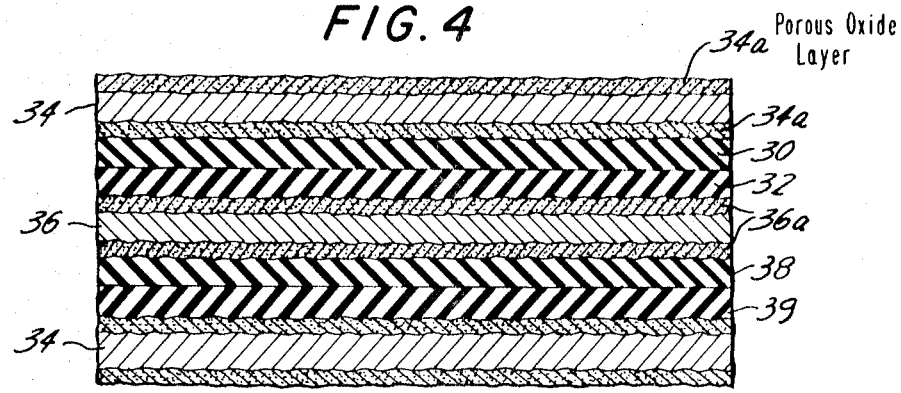
Figure 5:
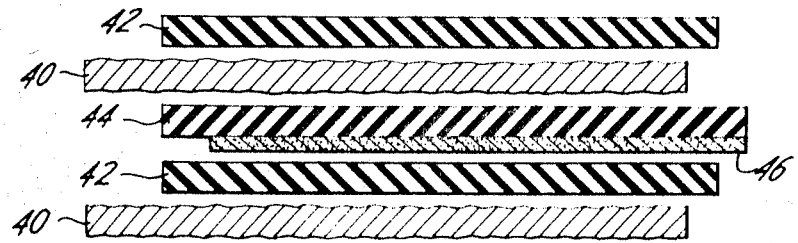

FIGS. 3 and 4 are fragmentary cross sections of wound capacitor sections as viewed from the plane 3—3 in FIG. 2, FIGS. 3 and 4 showing features of two different embodiments of the invention; and FIG. 5 is a diagrammatic cross section like FIG. 3 showing another illustrative wound capacitor section illustrating further features of the invention.

Figure 1:
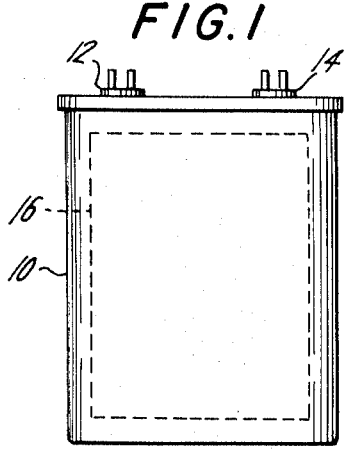
FIG. 1 is a lateral external view of a capacitor of a type to which the present invention applies.

In the drawings a standard form of capacitor is shown diagrammatically, including a sealed metal container 10 having two terminals 12 and 14 and containing a wound capacitor section 16 of foil electrodes separated by dielectric layers. In routine manufacture, the capacitor is fabricated in a way to appear in the form shown in FIG. 1 complete except for impregnation. An opening is left in the cover. Through this opening, the capacitor is first subjected to a prolonged vacuum treatment while being heated, for extracting air and moisture from the wound capacitor section. Then impregnating liquid is admitted to the container while maintaining very low absolute pressure, and after being held in this condition for a prolonged period, the pressure in the container is allowed to rise to atmospheric pressure, the capacitor being kept hot but below the melting temperature of the film. The opening in the container is then sealed, and the capacitor is ready for use. Details of the impregnation process vary, particularly with respect to times and temperatures, depending on the materials used for the dielectric and the impregnant, and on the size of the capacitor winding. The temperature is limited to avoid excessive shrinkage of the film. The impregnating liquid is warmed to reduce its viscosity, and the capacitor is kept warm after the impregnating liquid has flooded the container, to promote thorough penetration of the liquid into the wound capacitor section within reasonable processing times.

The foregoing represents a common routine practice used in making various forms of impregnated capacitors. Indeed all-film capacitors were manufactured by Cornell-Dubilier Electric Company many years ago using aluminum foil, polypropylene film and silicone impregnating liquid. Other liquids have been desirable but unsuited to use in making such capacitors, especially large sizes of capacitors, because of the protracted impregnation times that would be needed.

The impregnation process can be speeded up for liquid impregnants generally, and it can be reduced to practical time periods in the case of liquids that previously could not be used to impregnate all-film capacitors, because of inordinate time requirements, by incorporating a network of fine passages or grooves or fissures over the entire surface of each foil electrode facing each polymer film in the capacitor.

FIGS. 2 and 3 illustrate a capacitor section that includes electrodes 20 and 22 of metal foil separated by single film strips 24 and 26. Each strip of film has a foil surface that has an all over network of passages. Thus, foil 20 has such a multipassage surface 20a against film strip 24, and foil 22 has a multipassage surface 22a against film strip 26. The foil used is, typically, 0.00025 to 0.0005 in. thick, and with such foil the pattern of surface grooves should be of the order of 1/10 of the foil thickness, the grooves being generally too fine to be filled by plastic flow of the polymer film facing the groove pattern. Such grooves can be made, in theory, by a mechanical embossing or coining treatment.

A treatment that not only provides the pattern of grooves but also enhances the wettability of the foil by impregnating liquids is chemical etching in a manner commonly used in the manufacture of electrolytic capacitors. One or both surfaces of a strip of aluminum foil are suitably etched for this purpose by passing the foil through a 5 percent aqueous solution of borax at 90° C. so as to expose any given area of the foil to the treatment for 3 to 5 minutes, followed by thorough washing. The etch process has the advantage of avoiding sharp projections on the foil, such as would be probable were a mechanical texturing process used instead. Sharp surface formations tend to create electric field concentrations, which would reduce the dielectric strength below that which might otherwise be realized with smooth-faced foil.

When a capacitor is made of strips of foil and film arranged as in FIG. 3, the foil-film interfaces 20a, 24 and 22a, 26 promote evacuation and then penetration of impregnant over the whole area of the film. In the case of films such as polypropylene that swell when exposed to certain impregnants, such as chlorinated diphenyl and other chlorinated hydrocarbons commonly used for impregnating capacitors and mineral oil, it is sufficient to provide only one surface pattern of grooves to confront each strip of film, since swelling of the film and some limited theoretical penetration of the film by the impregnant tends to fill any mechanically developed voids at the opposite surface of the film. Of course, both surfaces of the foil may be etched, for faster thorough impregnation. Also, by providing both surfaces of the foil with a pattern of grooves or other surface fissures or passages, two strips of film can be used. Such an arrangement is represented in FIG. 4, illustrating a still further manner of preparing the surface of the foil for promoting impregnation.

In FIG. 4, synthetic polymer films 30 and 32 face each other and serve together as the dielectric separator between strips of foil 34 and 36 that constitute two opposite electrodes of the capacitor. Strips of the same synthetic polymer film 38 and 39 face each other and form the dielectric separator between the opposite Hz., of foil strips 34 and 36. The opposite surfaces 34a and 36a of each foil strip can be surface-grooved by etching, as described in connection with FIG. 3. However, a hydrated oxide of the metal foil, formed in situ and covering the area of the foil exposed to each strip of polymer film, provides a porous surface layer promoting impregnation as discussed above. The hydrated oxide layer is nonpolar and acts electrostatically as if it were a surface of the metal electrode. It is so very thin that its resistivity is very low at low frequencies such as 60 Hz., compared with that of the polymer film.

Aluminum foil can be effectively treated to form a nonpolar porous hydrated oxide layer in situ, on one or both surfaces, by precleaning the foil briefly in a 5 percent aqueous borax solution at 90° C., or 15 percent HCl at 50° C., followed by 4 minutes in water at 98° C.

Hydrous oxide tends to form slowly on aluminum that is freely exposed to the air, to a limit of 10 A. Such oxide is not useful for present purposes because it is much too thin for all practical times of exposure. The hydrated oxide resulting from the foregoing process involving boiling after cleaning is approximately 2,500 A. thick. It is porous and essentially nonrectifying. It differs widely from electrolytically formed oxide that is prominently polar and nonporous.

The foil surface, e.g., aluminum foil, may be etched by prolonged treatment in heated borax solution as described above and then exposed to boiling water for 4 minutes or longer, to product a surface having both the etched grooves and the porous surface layer of hydrated oxide as discussed separately in connection with FIGS. 3 and 4.

FIG. 5 illustrates a further application of various features of the invention. In FIG. 5 an electrode consisting of a wound strip of foil 40 has its left-hand edge (as shown in the drawing) extended beyond the left-hand edges of strips 42 and 44 of synthetic film, especially polypropylene. A metallized-film electrode 46 is deposited on synthetic film strip 44 to constitute a second electrode of the capacitor. Metallized film electrode 46 is separated from successive convolutions of foil electrode 40 by film strips 42 and 44, respectively. At its left-hand edge polymer film 44 has a bare marginal strip at the right-hand extremity of the wound section as shown, film strip 42 extends beyond the right-hand edge of the successive convolutions of foil 40, and the right-hand edge of strip 44 of polymer film and its metallized electrode 46 extend beyond all the other convolutions of the winding. In the completed capacitor, after the usual processing involving the application of heat, the marginal edge of strip 44 tends to curl away from the side which bears the metallized-film electrode, thus making it relatively easy to form a connection to electrode 46 at the end of the wound section.

Foil 40 has its opposite surfaces treated to provide a network of minute passages on both of its opposite surfaces, either by chemically etching both surfaces or by forming said essentially nonpolar porous hydrated oxide thereon, thus providing a way of exposing one whole surface of strip 42 and one whole surface of strip 44 to effective impregnation. As before, where a dielectric polymer strip is of material such as polypropylene and the impregnant is a liquid such as chlorinated diphenyl or other chlorinated hydrocarbons of the usual types used as impregnants for capacitors, or mineral oil or the like, each of the films is exposed to the impregnant over one whole surface by virtue of the impregnation passages provided by the treated opposite surfaces of foil 40. In this arrangement the dielectric causes swelling of the film and penetration through the film so that the voids are effectively filled by the impregnant.

In each of the examples above the impregnant advantageously will include a suitable scavenger such as the various epoxides well known to the art. Capacitors of the form in FIG. 5 are self-clearing by virtue of local vaporization of the metallized electrode film in case a local fault should develop. The scavenger has particular value in this form of capacitor since it promotes cleanup of the materials given off locally at each burnout point.

In the foregoing, the preferred material employed as the synthetic polymer film is polypropylene, and such material is the crystalline bidirectionally oriented form of that polymer. When exposed to a variety of common impregnants used in capacitor manufacture such as mineral oil, chlorinated diphenyl, and a mixture of chlorinated diphenyl containing a minor proportion of trichlorobenzene, the film in each case swells after hours of exposure to the impregnant, especially at the elevated temperatures used in the impregnation process.

Various modifications and changes in the illustrative examples will readily occur to those skilled in the art, and consequently the invention should be construed broadly, consistent with the spirit and scope of the invention.

What is claimed is:

1. A capacitor having a container and a convolutely wound capacitor section in said container, said capacitor section comprising a pair of electrodes and strips of dielectric material separating said electrodes, all of said strips of dielectric material being synthetic polymer films, at least one of said electrodes being a strip of foil, and said electrodes including two foil surfaces having textures providing a pattern of chemically produced minute passages communicating from all parts of the area thereof to the edges thereof, each of said films having at least one surface thereof bearing against a said electrode surface having a texture-providing pattern of passages, and an impregnant thoroughly impregnating said wound capacitor section.

2. A capacitor in accordance with claim 1 wherein said minute passages are formed by surface etching.

3. A capacitor in accordance with claim 1 wherein said strip of foil is aluminum and wherein said pattern of minute passages is formed by chemical etching in a 5 percent aqueous solution of borax.

4. A capacitor in accordance with claim 1 wherein said strip of foil is aluminum and wherein said pattern of minute passages is formed of an integral nonpolar porous hydrated oxide layer substantially thicker than 10 A.

5. A capacitor in accordance with claim 4 wherein said oxide layer is that resulting from precleaning the foil followed by 4 minutes treatment in water at 98° C.

6. A capacitor in accordance with claim 1 wherein each of said electrodes is a strip of aluminum foil having the opposite surfaces thereof provided with patterns of minute passages as aforesaid and wherein said foils are separated by pairs of said films.

7. A capacitor in accordance with claim 6 wherein said strips of foil are aluminum and wherein the opposite surfaces of each of said strips of foil have patterns of minute passages as aforesaid consisting of hydrated aluminum oxide many times thicker than 10 A.

8. A capacitor in accordance with claim 1 wherein said electrodes consist of a strip of foil and a metallized layer on one of said films, both surfaces of said strip of foil having patterns of minute passages as aforesaid.

9. A capacitor in accordance with claim 1 wherein said films are of polypropylene and wherein said impregnant consists at least largely of a chlorinated hydrocarbon.

10. A capacitor in accordance with claim 1 wherein said film and said impregnant are materials related to each other such that prolonged exposure of the film to the impregnant produces swelling of the film.

* * * * *